(12) United States Patent
Dulka et al.

(10) Patent No.: US 8,349,408 B2
(45) Date of Patent: Jan. 8, 2013

(54) METHOD OF PROTECTING REACTOR COMPONENTS FROM FOULING

(75) Inventors: Catherine Procik Dulka, West Chester, PA (US); Young Jin Kim, Clifton Park, NY (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 1162 days.

(21) Appl. No.: 12/230,692

(22) Filed: Sep. 3, 2008

(65) Prior Publication Data
US 2010/0055308 A1    Mar. 4, 2010

(51) Int. Cl.
*C23C 16/40*    (2006.01)
*F04F 5/00*    (2006.01)
(52) U.S. Cl. ............... 427/419.1; 427/255.31; 427/453
(58) Field of Classification Search ............... 427/419.2, 427/248.1–255.7, 453; 239/591; 376/305, 376/372; 417/195
See application file for complete search history.

(56) References Cited

U.S. PATENT DOCUMENTS

| | | | |
|---|---|---|---|
| 5,444,747 A | | 8/1995 | Terhune |
| 5,715,290 A | * | 2/1998 | Uetake et al. ............... 376/306 |
| 6,633,623 B2 | | 10/2003 | Dulka et al. |
| 2005/0265512 A1 | | 12/2005 | Dulka et al. |
| 2007/0003001 A1 | | 1/2007 | Dulka et al. |

* cited by examiner

*Primary Examiner* — William Phillip Fletcher, III
(74) *Attorney, Agent, or Firm* — Harness, Dickey & Pierce, P.L.C.

(57) ABSTRACT

A method of protecting a reactor component from fouling includes forming an oxide layer on a metal foil to achieve an antifouling liner. The antifouling liner may be manipulated into a shape that conforms to one or more surfaces of the reactor component that are contacted by a fluid during reactor operation. The metal foil portion of the antifouling liner is secured to the surface(s) of the reactor component by suitable means. As a result, the oxide layer portion of the antifouling liner is exposed to the fluid in the reactor, thereby reducing or preventing the fouling of the component.

31 Claims, 6 Drawing Sheets

METHOD OF PROTECTING REACTOR COMPONENTS FROM FOULING

BACKGROUND

1. Technical Field

The present disclosure relates to methods for reducing or preventing the fouling of components that are exposed to the circulating fluid of a reactor.

2. Description of Related Art

A conventional boiling water reactor (BWR) has a cooling system for conducting heat away from the nuclear fuel. The cooling system achieves the necessary heat conduction by circulating a cooling fluid through the reactor core. Over time, charged particles in the cooling fluid will accumulate on various components of the cooling system via electrostatic deposition according to zeta potential theory. The charged particles are typically deposited on metal surfaces of components that are exposed to the cooling fluid. The accumulation of charged particles on the components is known as fouling. Fouling reduces the flow of cooling fluid through the reactor core. As a result, a higher drive flow is required to maintain the desired core flow. The higher drive flow may increase vibrations, which may adversely affect the structural integrity of the cooling system, while also decreasing fuel efficiency. Thus, fouling degrades the performance of the cooling system.

Prior efforts to address fouling include cleaning the affected component, but such cleaning is more than a one-time process and must be performed at regular intervals. Other efforts to reduce or prevent the electrostatic deposition of charged particles have been directed to coating the various portions of the cooling system with an antifouling film. However, many components of a conventional cooling system are larger than the capacities of current coating equipment. As a result, an existing component may have to be removed from the system, transported to a coating facility, cut into several smaller pieces, coated individually, and then welded back together and reinstalled in the system, thus complicating the coating process as well as prolonging the disruption to the operation to the reactor.

SUMMARY

A method of protecting a reactor component from fouling may include forming an antifouling liner that conforms to one or more corresponding surfaces of the reactor component, the one or more corresponding surfaces being in contact with a circulating fluid during reactor operation, and the antifouling liner including an oxide layer on a metal foil; and securing the antifouling liner to the one or more corresponding surfaces of the reactor component.

Forming the antifouling liner may include forming the oxide layer on the metal foil to achieve a composite material and manipulating the composite material to conform to one or more corresponding surfaces of the reactor component. Alternatively, forming the antifouling liner may include manipulating the metal foil to conform to one or more corresponding surfaces of the reactor component and forming an oxide layer on the metal foil.

The metal foil may be formed of a transition metal. The transition metal is a group 4 element (e.g., titanium, zirconium) or a group 5 element (e.g., tantalum). The metal foil may have a thickness of about 1-2 mils or more. The oxide layer may be formed by oxidation in a controlled oven environment, by a suitable deposition process (e.g., chemical vapor deposition (CVD), physical vapor deposition (PVD)), by a suitable thermal spray process (e.g., plasma, high velocity oxygen fuel (HVOF)), or by other suitable coating processes. The oxide layer may be formed to a thickness of about 1-2 microns or more. The oxide layer may be formed of $TiO_2$ or another suitable oxide (e.g., $Ta_2O_5$, $ZrO_2$).

The antifouling liner may conform to an inner surface of the reactor component. Such a reactor component may be a nozzle of an inlet mixer of a jet pump. In such a case, the antifouling liner may be manipulated into a sleeve that fits within the nozzle. Alternatively, the antifouling liner may conform to an outer surface of the reactor component. Such a reactor component may be an impeller, a control rod blade, or a control rod spacer. The antifouling liner may be secured to the reactor component by welding, via spring application, or through use of a suitable adhesive.

BRIEF DESCRIPTION OF THE DRAWINGS

The features and advantages of the example embodiments herein may become more apparent upon review of the detailed description in conjunction with the accompanying drawings. The accompanying drawings are intended to depict various example embodiments and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on", "connected to", "coupled to", or "covering" another element or layer, it may be directly on, connected to, coupled to, or covering the other element or layer or intervening elements or layers may be present. In contrast, when an element is referred to as being "directly on", "directly connected to", or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper", and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to the present disclosure, an antifouling liner may be implemented to reduce or prevent the fouling of a reactor component. Although the examples herein illustrate the use of the antifouling liner in the context of a boiling water reactor (BWR), it should be understood that the antifouling liner may also be utilized in other reactors (e.g., pressurized water reactors (PWR), CANDU reactors, fluid bed reactors) as well as other applications where fouling adversely affects the performance of a system. For example, the antifouling liner may also be used to reduce or prevent the fouling of wind turbine propeller blades by dust particles in the air.

The nature of the antifouling liner according to the present disclosure as an independent article enables the antifouling liner to be implemented with relative ease and with minimal disruption to system operations. As a result, the antifouling liner may be implemented directly at a customer site and may be utilized for components that would otherwise be too large to be removed for conventional coating applications.

A method of protecting a reactor component from fouling according to the present disclosure may include initially forming or otherwise obtaining a metal foil. The metal foil may be formed of a transition metal. However, other suitable metals, metalloids, or alloys thereof may be utilized as long as the metals, metalloids, or alloys are capable to being oxidized to form an oxide layer on the metal foil or exhibit sufficient adhesion for the deposition of an oxide layer on the metal foil.

For example, the metal may be a group 4 element (e.g., titanium (Ti), zirconium (Zr), hafnium (Hf)), a group 5 element (e.g., niobium (Nb), tantalum (Ta)), or a suitable alloy (e.g., titanium alloy, tantalum alloy, zirconium alloy, steel alloy). When the metal foil is formed of an alloy (e.g., type 304 stainless steel), at least one of a titanium layer, a tantalum layer, and a zirconium layer may be optionally formed (e.g., via a suitable deposition or thermal spray method) on the alloy foil. The metal foil may be formed to a thickness of about 1-2 mils. However, it should be understood that the metal foil may have a thickness greater (or less) than 1-2 mils depending on the application. It should also be understood that a mil (which is also known as a thou) is $\frac{1}{1000}$ of an inch.

Figure 1A:
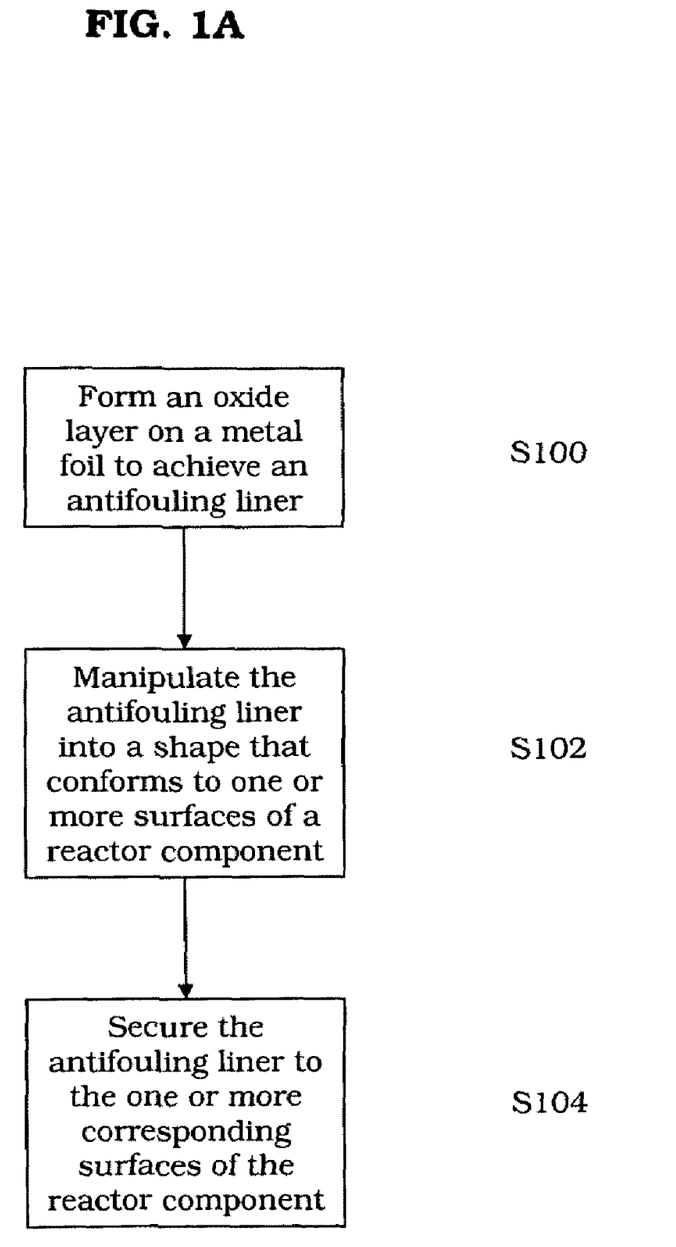
FIGS. 1A-1B are flowcharts of methods of protecting a reactor component from fouling according to example embodiments.
Figure 1B:
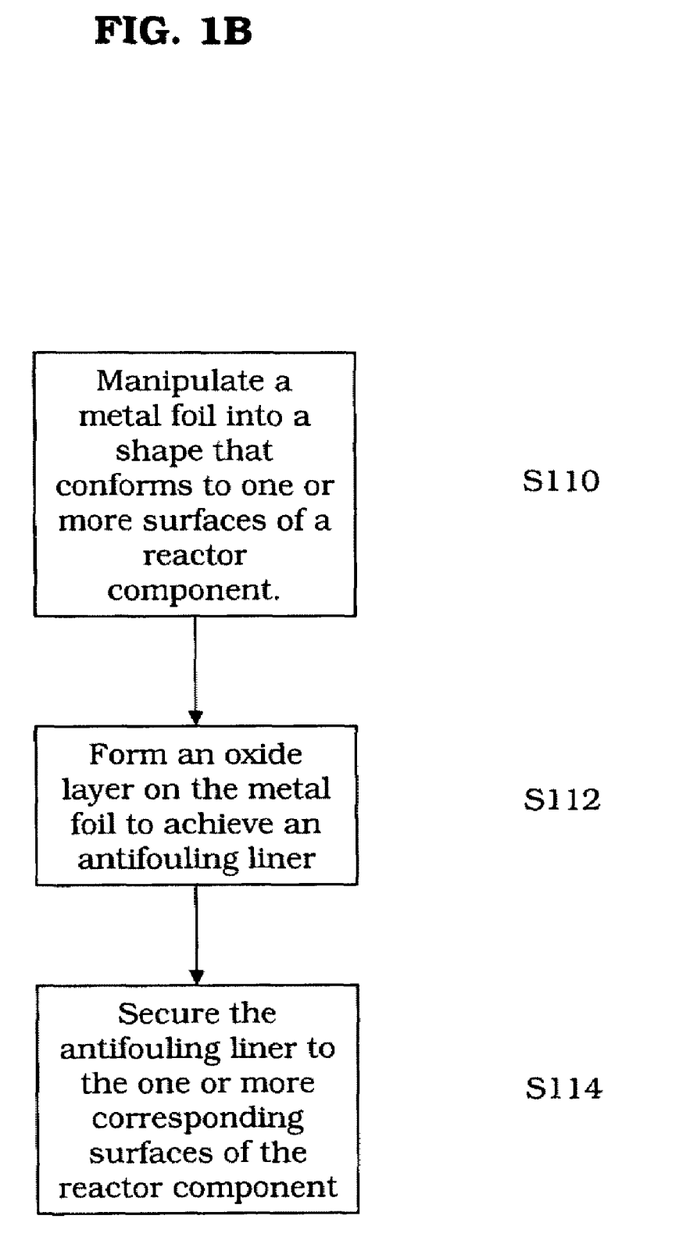

FIGS. 1A-1B are flowcharts of methods of protecting a reactor component from fouling according to example embodiments. Referring to step S100 of FIG. 1A, an oxide layer is formed on the metal foil such that the combination of the oxide layer and the metal foil constitutes an antifouling liner. For example, the oxide layer may be formed of $TiO_2$, $ZrO_2$, $HfO_2$, $Nb_2O_5$, $Ta_2O_3$, $Ta_2O_5$, or other suitable oxides. The metal foil provides the requisite strength and flexibility to the antifouling liner, while the oxide layer of the antifouling liner electrically insulates the reactor component from the charged particles in the circulating fluid. As a result, the electrostatic deposition of charged particles on the surfaces (e.g., metal surfaces) of the reactor component may be reduced or prevented.

The oxide layer may be formed by oxidation in a standard controlled oven environment. In such a case, the oxide layer may be a metal oxide of the metal foil. For example, when the metal foil is formed of titanium (Ti), the metal foil may be oxidized in a controlled oven environment to form a $TiO_2$ layer on the Ti foil. As a result, the $TiO_2$ layer and the Ti foil may constitute an antifouling liner.

Alternatively, the oxide layer may be formed by a standard deposition process (e.g., chemical vapor deposition (CVD), physical vapor deposition (PVD)), by a standard thermal spray process (e.g., plasma, high velocity oxygen fuel (HVOF)), or by another suitable coating process. In such a case, the composition of the oxide layer depends on the source materials used in the CVD process. For example, a $Ti(OC_2H_5)_4$ source gas may be used in a CVD process to form a $TiO_2$ layer on a stainless steel foil. As a result, the $TiO_2$ layer and the stainless steel foil may constitute an antifouling liner.

The oxide layer may be formed to a thickness of about 1-2 microns (micrometers), although the dimensions may be greater (or less) than 1-2 microns depending on the application. It should be understood that the antifouling liner is not exclusive with regard to the oxide layer and the metal foil. Rather, the antifouling liner may include additional materials that further the interest of reducing or preventing electrostatic deposition. Additionally, the oxide layer may be formed on the metal foil after the metal foil has been manipulated into a shape that conforms to one or more corresponding surfaces of the reactor component.

Referring to step S102 of FIG. 1A, the antifouling liner is manipulated into a shape that conforms to one or more corresponding surfaces of the reactor component. The corresponding surfaces of the reactor component are those surfaces that are in contact with a circulating fluid (liquid or gas) during reactor operation and that are susceptible to fouling. For example, without being bound by the following observations, it has been observed that reactor components having surfaces that are formed of metal and that are also exposed to a circulating fluid at a relatively high velocity are particularly susceptible to fouling.

The antifouling liner may be manipulated to conform to an inner surface of the reactor component. For example, the reactor component may be a part of a jet pump. The part may be a constituent of an inlet mixer of the jet pump. In particular, the constituent may be a nozzle of the inlet mixer. When the reactor component is a nozzle of an inlet mixer of a jet pump, the antifouling liner may be manipulated into a sleeve to conform to the inner surface of the nozzle. However, it should be understood that the reactor component may be any component that is susceptible to fouling and that would, thus, benefit from the application of the antifouling liner. As a result, the antifouling liner may have a variety of shapes/forms depending on the surface profiles of various reactor components.

Alternatively, the antifouling liner may be manipulated to conform to an outer surface of the reactor component. For example, the reactor component may be an impeller, a propeller, a control rod blade, a control rod spacer, or other part having an outer surface that is susceptible to fouling. When the reactor component is an impeller, the antifouling liner may be manipulated into a covering that conforms to the outer surface of the impeller. As noted above, it should be understood that the reactor component may be any component that is susceptible to fouling and that would, thus, benefit from the application of the antifouling liner. As a result, the antifouling liner may have a variety of shapes/forms depending on the surface profiles of various reactor components.

Referring to step S104 of FIG. 1A, the antifouling liner is secured to the corresponding surfaces of the reactor component. The antifouling liner may be secured to the reactor component by welding (e.g., tack welding). Alternatively, the antifouling liner may be secured to the reactor component by spring application. Furthermore, the antifouling liner may be secured to the reactor component with a suitable adhesive (e.g., high temperature, water-insoluble cement) or other appropriate means. For example, when the reactor component is a nozzle of an inlet mixer of a jet pump, the antifouling liner may be manipulated into a sleeve, inserted into the nozzle, and welded to the inner surface of the nozzle.

Alternatively, referring to step S110 of FIG. 1B, the metal foil is first manipulated into a shape that conforms to one or more corresponding surfaces of the reactor component. Referring to step S112 of FIG. 1B, an oxide layer is then formed on the metal foil to achieve an antifouling liner. Referring to step S114 of FIG. 1B, the antifouling liner is secured to the corresponding surfaces of the reactor component.

Figure 2:
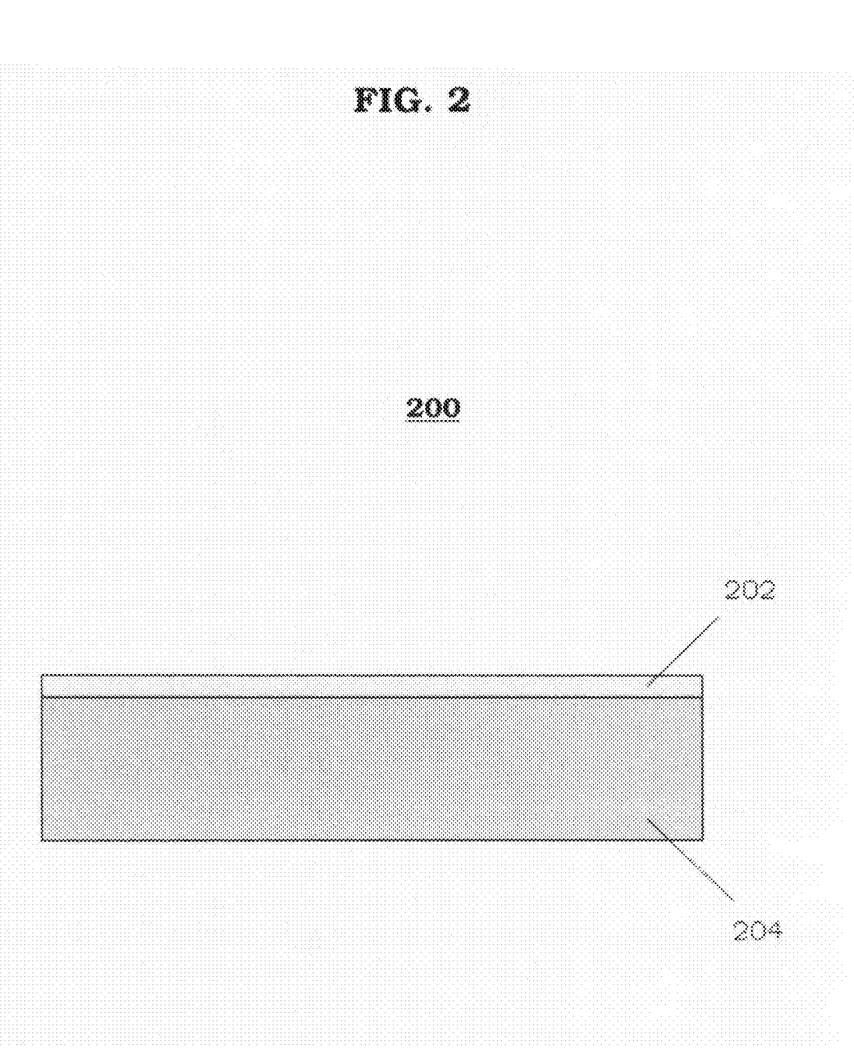
FIG. 2 is a cross-sectional view of an antifouling liner according to an example embodiment.

FIG. 2 is a cross-sectional view of an antifouling liner according to an example embodiment. Referring to FIG. 2, the antifouling liner 200 may have the oxide layer 202 coated or oxidized on a metal foil 204. The antifouling liner 200 may be manipulated into a variety of shapes to enable the antifouling liner 200 to be readily secured to one or more surfaces of a component that are susceptible to fouling. As noted above, the antifouling liner 200 may include additional materials and/or layers that further the reduction or prevention of the fouling of the component.

Figure 3:
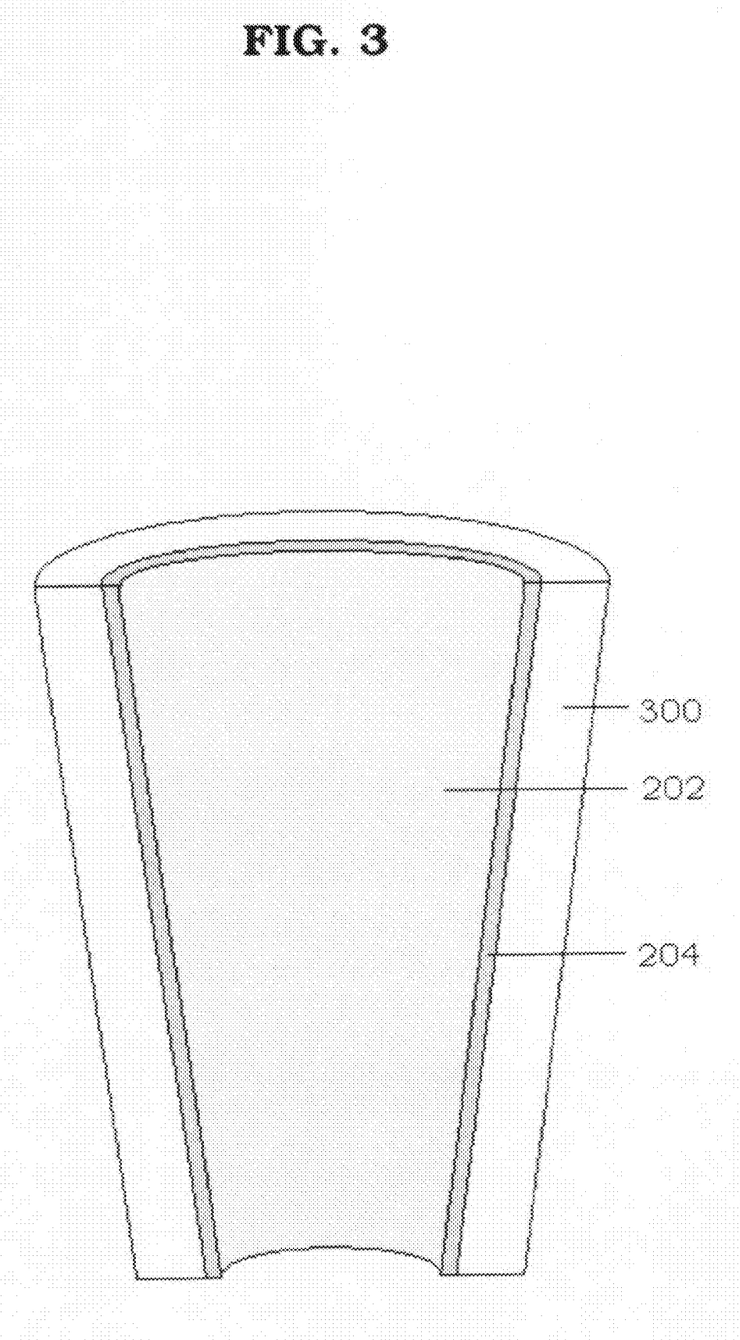
FIG. 3 is a cross-sectional view of an antifouling liner that is disposed on an inner surface of a nozzle according to an example embodiment.

FIG. 3 is a cross-sectional view of an antifouling liner that is secured to the inner surface of a nozzle according to an example embodiment. Referring to FIG. 3, the antifouling liner is manipulated into a tapering sleeve so as to conform to an inner surface of the nozzle 300. The antifouling liner may be applied to all or just a portion of the inner surface of the nozzle 300. Although the antifouling liner is relatively thin, the edges of the antifouling liner may nevertheless be adjusted (e.g., machined) so as to reduce or prevent any potential disruption to the fluid flow. The metal foil 204 of the antifouling liner is secured (e.g., welded, cemented) to the inner surface of the nozzle 300. As a result, the oxide layer 202 is exposed to the fluid that passes through the nozzle 300 during regular operation, thereby protecting the inner surface of the nozzle 300 from fouling.

It should be understood that the antifouling liner may be applied to other inner surfaces that are susceptible to fouling. For example, the antifouling liner may be applied to the inner surface of the recirculation piping of the reactor. In such a case, the antifouling liner may be manipulated into a cylindrical sleeve to conform to the inner surface of the piping. Alternatively, the antifouling liner may be in the form of one or more sheets that are applied to a desired surface.

Figure 4:
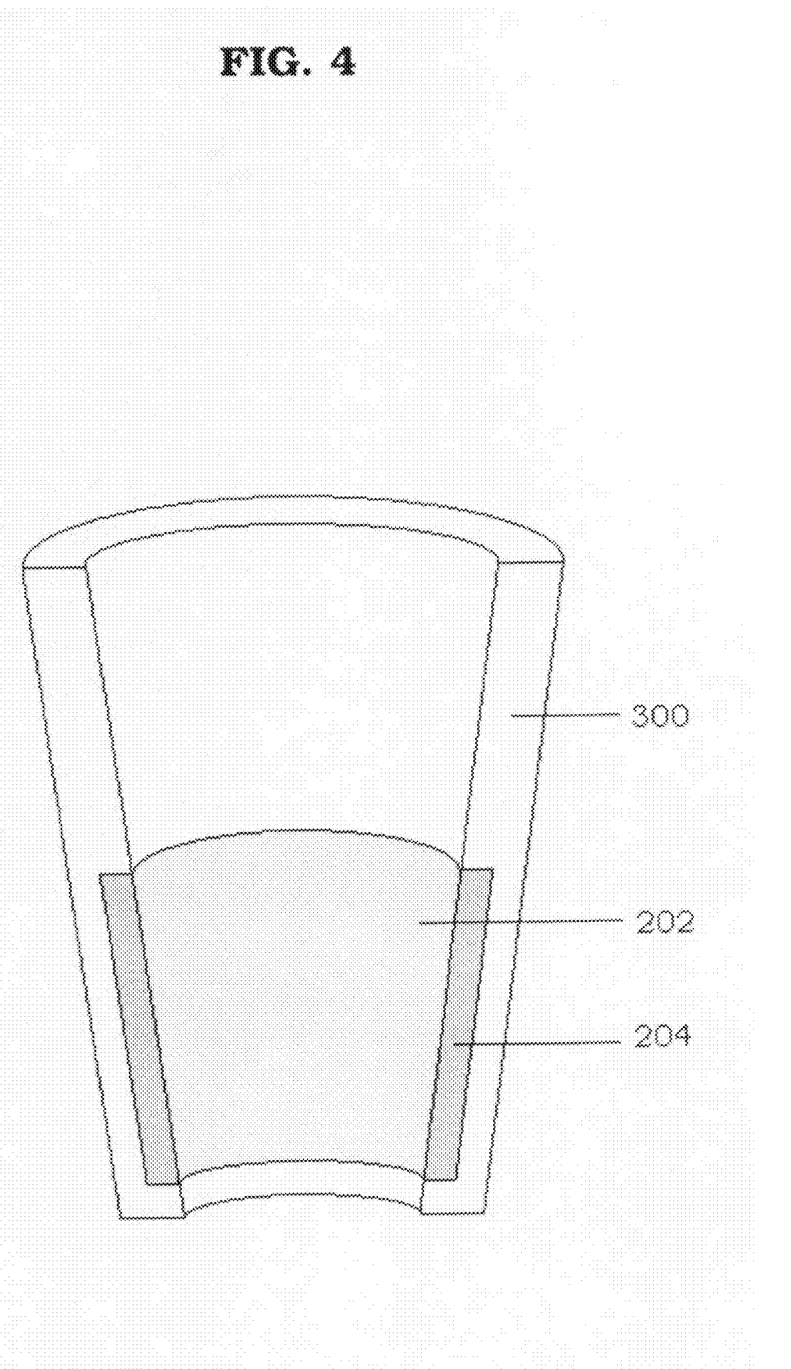
FIG. 4 is a cross-sectional view of an antifouling liner that is disposed within a recessed region of an inner surface of a nozzle according to an example embodiment.

FIG. 4 is a cross-sectional view of an antifouling liner that is disposed within a recessed region of an inner surface of a nozzle according to an example embodiment. Referring to FIG. 4, a recessed region is formed in an inner surface of the nozzle 300 by a standard process (e.g., machining). The antifouling liner is manipulated into a tapering sleeve that fits within the recessed region. Thus, the depth and length of the recessed region corresponds to the thickness and length of the antifouling sleeve. The metal foil 204 of the antifouling sleeve is secured (e.g., welded, cemented) to the inner surface of the nozzle 300. As a result, the oxide layer 202 is exposed to the fluid that passes through the nozzle 300 during regular operation, thereby protecting the inner surface of the nozzle 300 from fouling.

Additionally, a well-fitted antifouling sleeve in the recessed region provides a relatively smooth and continuous flow surface inside the nozzle 300. Consequently, any potential disruptions to the flow characteristics of the fluid traveling through the nozzle 300 may be reduced or prevented. It should be understood that the recessed region and antifouling liner may be applied to other inner surfaces of components that are susceptible to fouling.

Figure 5:
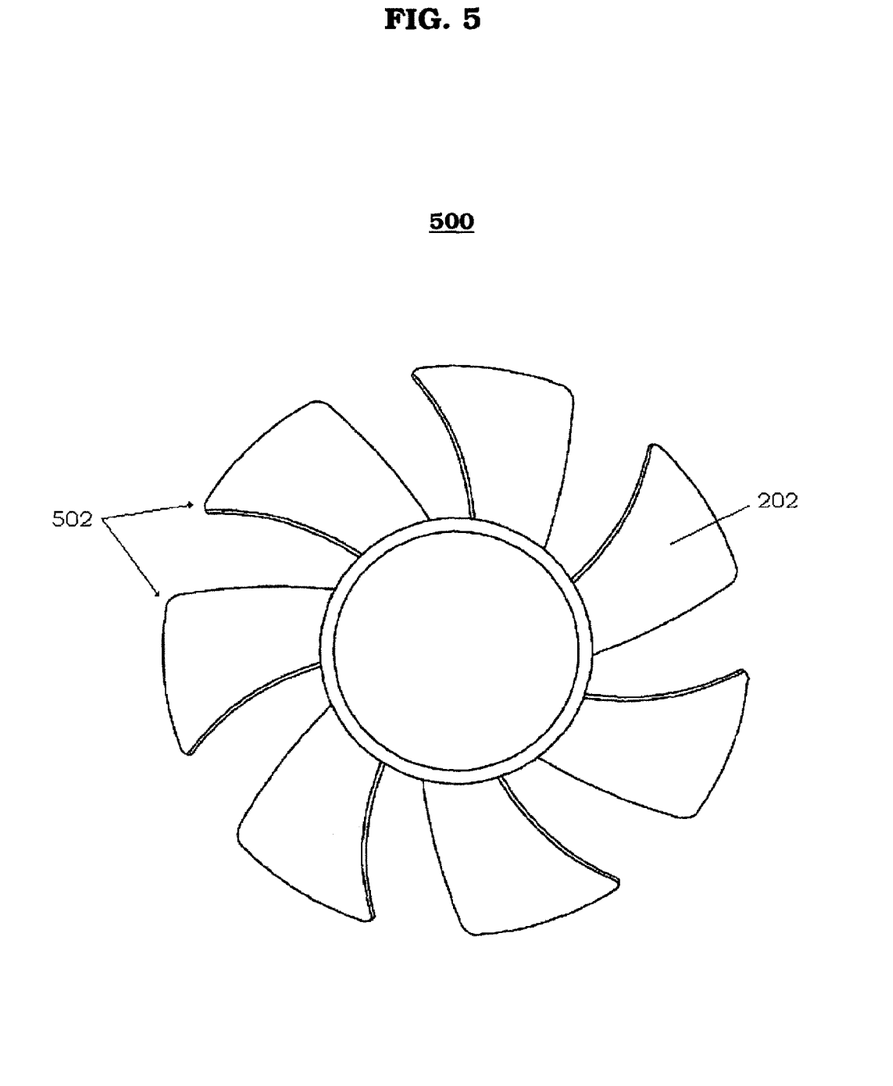
FIG. 5 is a plan view of an antifouling liner that is disposed on an outer surface of the blades of an impeller according to an example embodiment.

FIG. 5 is a plan view of an antifouling liner that is disposed on an outer surface of the blades of an impeller according to an example embodiment. Referring to FIG. 5, an antifouling liner may be secured onto the blades 502 of an impeller 500. The metal foil (not shown) of the antifouling liner is secured (e.g., welded, cemented) onto the outer surfaces of the blades 502. As a result, the oxide layer 202 is exposed to the fluid that interacts with the blades 502 of the impeller 500 during regular operation, thereby protecting the blades 502 of the impeller 500 from fouling.

Varying amounts of the impeller 500 may be covered. For example, the antifouling liner may be applied only to the blades 502 (entire surface of each blade or just a portion thereof) of the impeller 500. On the other hand, the entire surface of the impeller 500 may be covered. When applying the antifouling liner to the blades 502, the antifouling liner may be cut and deformed so as to conform to the blade surface. The antifouling liner may be applied to one or more sides of the blades 502. When coverage of all sides of a blade

502 is desired, the antifouling liner may be manipulated into a blade-shaped sleeve having one or more side openings that allow the sleeve to be slipped onto the blade 502 and secured. Furthermore, the amount of blade material may be reduced (e.g., by machining) to compensate for the presence of the antifouling liner on the blade 502.

It should be understood that an impeller may have various shapes and configurations. Additionally, as noted above, the antifouling liner may be applied to any surface (whether inner or outer) that is susceptible to fouling. Accordingly, the antifouling liner may be manipulated as needed to conform to the susceptible surface(s) so as to protect the desired portion(s) of a component from fouling.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of protecting a reactor component from fouling, comprising:
    forming an antifouling liner that conforms to one or more surface(s) of the reactor component, the antifouling liner comprising an oxide layer on a metal foil; and
    securing the antifouling liner to the one or more surface(s) of the reactor component,
    wherein the surface having the antifouling liner secured thereto contacts a circulating fluid during reactor operation.

2. The method of claim 1, wherein forming the antifouling liner comprises:
    forming the oxide layer on the metal foil to yield a composite material; and
    manipulating the composite material to conform to the one or more surface(s) of the reactor component.

3. The method of claim 1, wherein forming the antifouling liner comprises:
    manipulating the metal foil to conform to the one or more surface(s) of the reactor component; and
    forming the oxide layer on the metal foil.

4. The method of claim 1, wherein the metal foil is formed of a transition metal or an alloy thereof.

5. The method of claim 4, wherein the transition metal is a group 4 element.

6. The method of claim 5, wherein the group 4 element is titanium or zirconium.

7. The method of claim 4, wherein the transition metal is a group 5 element.

8. The method of claim 7, wherein the group 5 element is tantalum.

9. The method of claim 4, wherein the alloy is a titanium alloy, a tantalum alloy, a zirconium alloy, or a steel alloy.

10. The method of claim 9, wherein the titanium alloy is a Ti—V—Al alloy or a Ti—Nb alloy.

11. The method of claim 9, wherein the zirconium alloy is a Zircaloy-2 alloy, a Zircaloy-4 alloy, or a Zr—Nb alloy.

12. The method of claim 9, wherein the steel alloy is a type 304 stainless steel.

13. The method of claim 12, further comprising:
    forming at least one of a titanium layer, a zirconium layer, and a tantalum layer on the type 304 stainless steel foil.

14. The method of claim 1, wherein the metal foil has a thickness of about 1-2 mils or more.

15. The method of claim 1, wherein the oxide layer is formed by oxidation in an oven.

16. The method of claim 1, wherein the oxide layer is formed by a deposition process.

17. The method of claim 16, wherein the deposition process is a chemical vapor deposition process or a physical vapor deposition process.

18. The method of claim 1, wherein the oxide layer is formed by a thermal spray process.

19. The method of claim 18, wherein the thermal spray process is a plasma spray process or a high velocity oxygen fuel thermal spray process.

20. The method of claim 1, wherein the oxide layer is formed to a thickness of about 1-2 microns or more.

21. The method of claim 1, wherein the oxide layer is formed of at least one of $TiO_2$, $Ta_2O_5$, and $ZrO_2$.

22. The method of claim 1, wherein the antifouling liner conforms to an inner surface of the reactor component.

23. The method of claim 22, wherein the reactor component is a part of a jet pump.

24. The method of claim 23, wherein the part is a constituent of an inlet mixer of the jet pump.

25. The method of claim 24, wherein the constituent is a nozzle of the inlet mixer.

26. The method of claim 1, wherein the antifouling liner is a sleeve.

27. The method of claim 1, wherein the antifouling liner conforms to an outer surface of the reactor component.

28. The method of claim 27, wherein the reactor component is at least one of an impeller, a control rod blade, and a control rod spacer.

29. The method of claim 1, wherein the antifouling liner is secured to the reactor component by welding.

30. The method of claim 1, wherein the antifouling liner is secured to the reactor component by spring application.

31. The method of claim 1, wherein the antifouling liner is secured to the reactor component by an adhesive.

* * * * *